US008333651B2

(12) United States Patent
Payne et al.

(10) Patent No.: US 8,333,651 B2
(45) Date of Patent: Dec. 18, 2012

(54) METHODS FOR A GAME HAVING A BONUS GAME

(75) Inventors: Fred Anthony Payne, Pasadena, CA (US); Daniel Bowei Huang, Fremont, CA (US); Justin Tan Nguyen, Las Vegas, NV (US); Rex R. Carlson, Henderson, CA (US)

(73) Assignee: Aspect Group Limited, Santa Clara, CA (US)

( * ) Notice: Subject to any disclaimer, the term of this patent is extended or adjusted under 35 U.S.C. 154(b) by 59 days.

(21) Appl. No.: 13/047,746

(22) Filed: Mar. 14, 2011

(65) Prior Publication Data

US 2012/0238345 A1 Sep. 20, 2012

(51) Int. Cl.
*G06F 17/00* (2006.01)

(52) U.S. Cl. ........................................................ 463/20

(58) Field of Classification Search ............... 463/16–25
See application file for complete search history.

(56) References Cited

U.S. PATENT DOCUMENTS

| | | | | |
|---|---|---|---|---|
| 7,591,724 | B2 * | 9/2009 | Baerlocher | 463/20 |
| 8,167,704 | B2 * | 5/2012 | Yoshizawa | 463/20 |
| 2008/0287178 | A1 * | 11/2008 | Berman et al. | 463/20 |
| 2010/0075736 | A1 * | 3/2010 | Muir et al. | 463/20 |

* cited by examiner

*Primary Examiner* — Ronald Laneau
(74) *Attorney, Agent, or Firm* — Venture Pacific Law, PC

(57) ABSTRACT

A method for playing a game of chance having one or more primary reels for a base game and one or more secondary reels for a bonus game, comprises the following steps of, initiating the base game; drawing one or more symbols of the primary reels; if the drawn symbols of the primary reels comprise one or more bonus symbols, adjusting the secondary reels to draw symbols as a function of the bonus symbols; and evaluating the drawn symbols of the secondary reels for a winning combinations.

18 Claims, 4 Drawing Sheets

METHODS FOR A GAME HAVING A BONUS GAME

FIELD OF INVENTION

This invention relates to methods for games of chance, and, in particular, to methods for games of chance having a base game and a bonus game, where symbols on primary reels of the base game are used to affect the bonus game.

BACKGROUND

Gaming machines, such as slot machines, video poker machines and the like, have been a cornerstone of the gaming industry for several years. Generally, the popularity of such machines with players depends on the likelihood (or perceived likelihood) of winning money at these machines and the intrinsic entertainment value of these machines relative to other available gaming options. Players are most likely to be attracted to the most entertaining and exciting machines. Shrewd operators consequently strive to employ the most entertaining and exciting machines available because such machines attract frequent plays and hence increase profitability for the operator. Accordingly, in the competitive gaming machine industry, there is a continuing need for gaming machine manufacturers to produce new types of games, or enhancements to existing games, which will attract frequent plays by enhancing the entertainment value and excitement associated with the games.

One concept which has been successfully employed to enhance the entertainment value of a game is the concept of a "free" or "bonus" game which may be played in conjunction with a "base" game. The bonus game may comprise any type of game, either similar to or completely different from the base game, which is triggered upon the occurrence of a selected event or outcome of the base game. The bonus game is entered upon the appearance of a special symbol combination on the reels of the slot machine in the base game. One of the allures of the bonus game is that the player can play the bonus game to win an award without the risk of losing money since an additional wager is not needed to play the bonus game.

FIG. 1 illustrates a typical slot machine. A typical slot machine 10 can have a display 14 for viewing motor-operated reels or video graphic reels. Furthermore, the slot machine 10 can have a lever 12 for initiating play (e.g., initiating a base game or initiating a bonus game of the slot machine 10). Alternatively, the slot machine 10 may have one or more buttons (not shown) on the slot machine 10 for initiating play.

FIG. 2 illustrates a display of a slot machine having three pay lines and three primary reels. A display 16 can display a number of symbols of each of the reels 20, 22, and 24 that have been drawn and are in play. Three sample pay lines 30, 32, and 34 intersect the display of the symbols to indicate the symbols in play for winning an award according to a paytable. If a winning combination of symbols is intersected along one of the pay lines, then the player is given an award. The pay lines 30, 32, and 34 can be activated according to the rules of the base game and a wagered amount.

The base game is played by matching a number of symbols in a winning sequence. If a special combination of symbols is drawn, then a bonus game may be initiated. The bonus game can be played using the same primary reels and in the same game format. Additionally, a bonus game may be played on a different display or format, where the bonus game may have different rules from the base game.

Beyond the triggering of the bonus game, the symbols drawn in the base game do not affect the play of the bonus game. Furthermore, the base game does not give any predictive value of the outcome for the bonus game. Thus, the base game does little to further enhance the level of excitement. Therefore, there exists a need to implement a new game having a bonus game to entice and satisfy a player, where the symbols on the primary reels can be used to affect the play of the bonus game, beyond merely triggering the bonus game.

SUMMARY OF INVENTION

An object of this invention is to provide methods for a game having a bonus game, where symbols drawn on primary reels of the base game affect the play of the bonus game.

Another object of this invention is provide methods for a game having a bonus game, where secondary reels of the bonus game are kept static until a bonus symbol is drawn in a base game.

Yet another object of this invention is provide methods for a game having a bonus game, where each of the primary reels of the base game affects the outcome of at least one of the secondary reels.

Briefly, the present invention relates to a method for playing a game of chance having one or more primary reels for a base game and one or more secondary reels for a bonus game, comprising the following steps of, initiating the base game; drawing one or more symbols of the primary reels; if the drawn symbols of the primary reels comprise one or more bonus symbols, adjusting the secondary reels to draw symbols as a function of the bonus symbols; and evaluating the drawn symbols of the secondary reels for a winning combinations.

An advantage of this invention is that methods for a game having a bonus game are provided, where symbols drawn on primary reels of the base game affect the play of the bonus game.

Another advantage of this invention is that methods for a game having a bonus game are provided, where secondary reels of the bonus game are kept static until a bonus symbol is drawn in a base game.

Yet another advantage of this invention is that methods for a game having a bonus game are provided, where each of the primary reels of the base game affects the outcome of at least one of the secondary reels.

DESCRIPTION OF THE DRAWINGS

The foregoing and other objects, aspects, and advantages of the invention will be better understood from the following detailed description of the preferred embodiment of the invention when taken in conjunction with the accompanying drawings in which.

DETAILED DESCRIPTION OF THE PREFERRED EMBODIMENTS

In a preferred embodiment, a slot game of the present invention comprises primary reels for playing a base game and secondary reels for playing a bonus game. Various symbols are positioned on the primary reels and the secondary reels. Generally, the symbols are positioned one after another along each of the primary reels and the secondary reels. One or more symbols can be in play by displaying the one or more symbols. Note that the reels can be physical reels, computer-generated reels, an electronic list of symbols, or some combination thereof. A predefined subset of symbols of the primary reels (herein referred to as "bonus symbols") is used to affect the secondary reels by moving the secondary reels up and/or down a number of symbol positions. Since a reel can be an electronic list of symbols, adjusting the secondary reel can refer to traversing the symbol list of the secondary reel to display one or more symbols to play.

The primary reels and the secondary reels can have their own unique symbol set and pay-tables. A bonus symbol will not necessarily appear as part of every outcome on the primary reels since symbols are drawn using a random number generator ("RNG") or a weighted algorithm. Thus, the displayed symbols in play on the secondary reels can be static through a number of plays of the base game until a bonus symbol is drawn on the primary reels to adjust the displayed symbols on the secondary reels.

Figure 1:
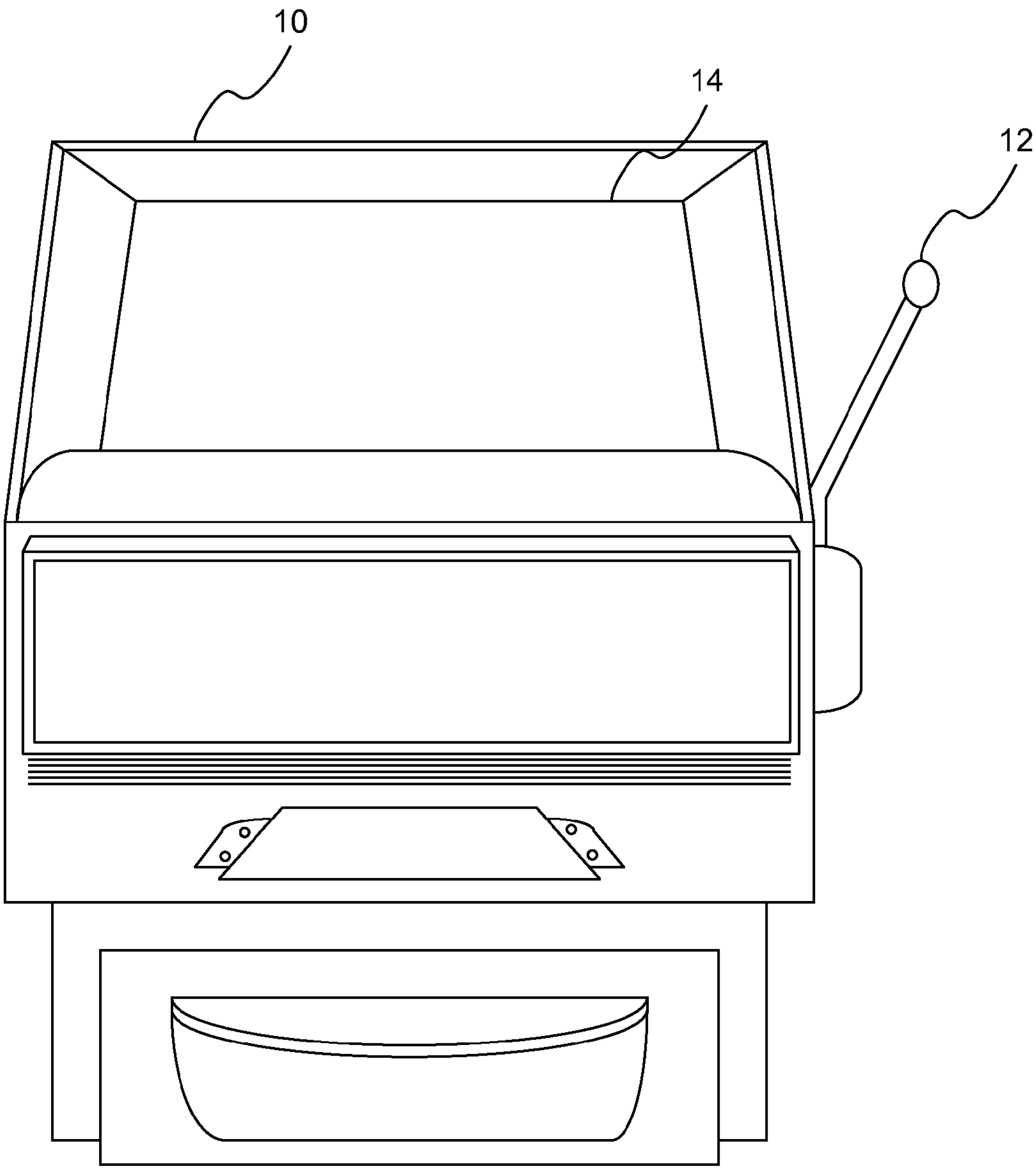
FIG. 1 illustrates a typical slot machine.
Figure 2:
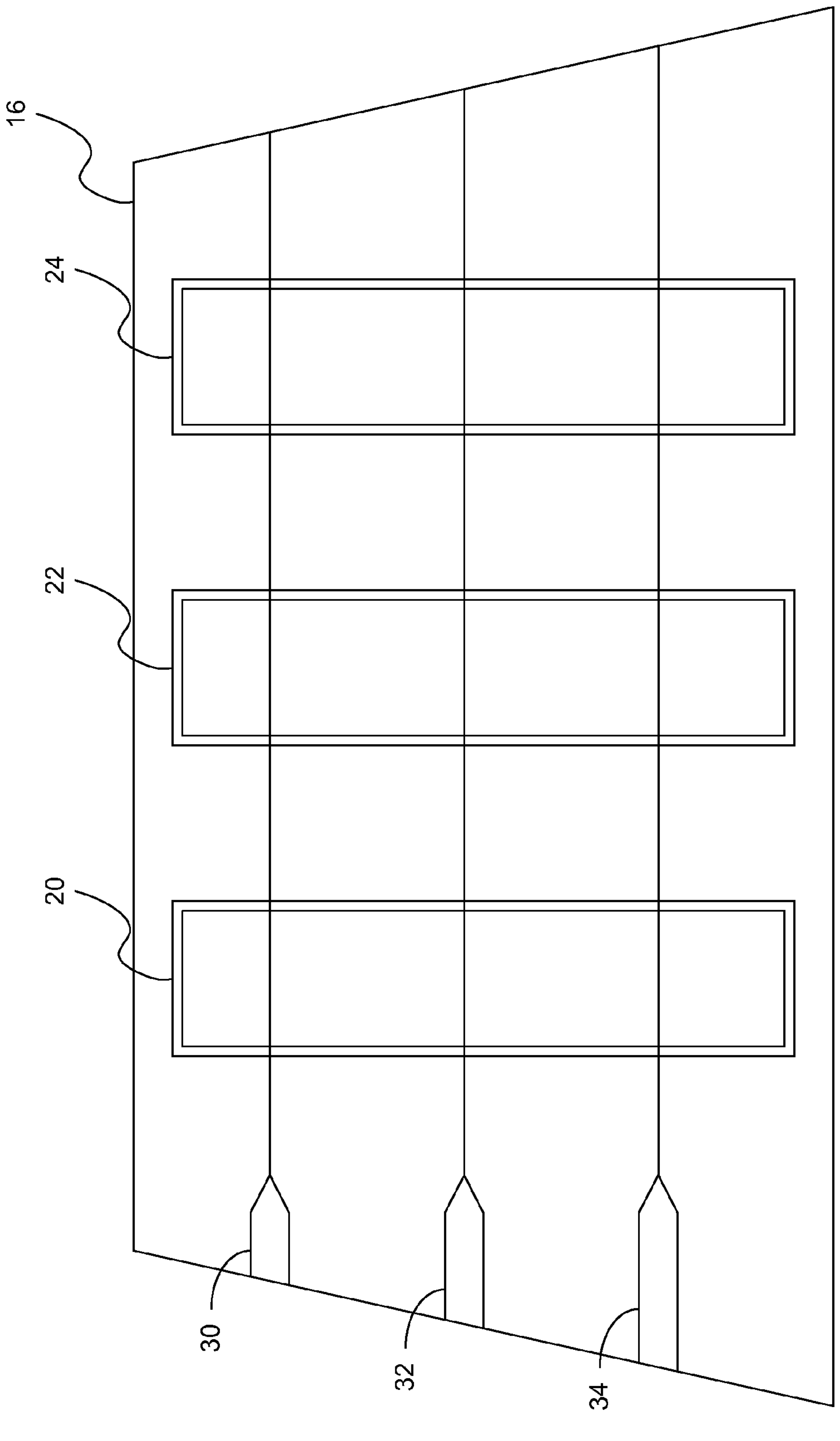
FIG. 2 illustrates a display of a typical slot machine having three pay lines and three reels.
Figure 3:
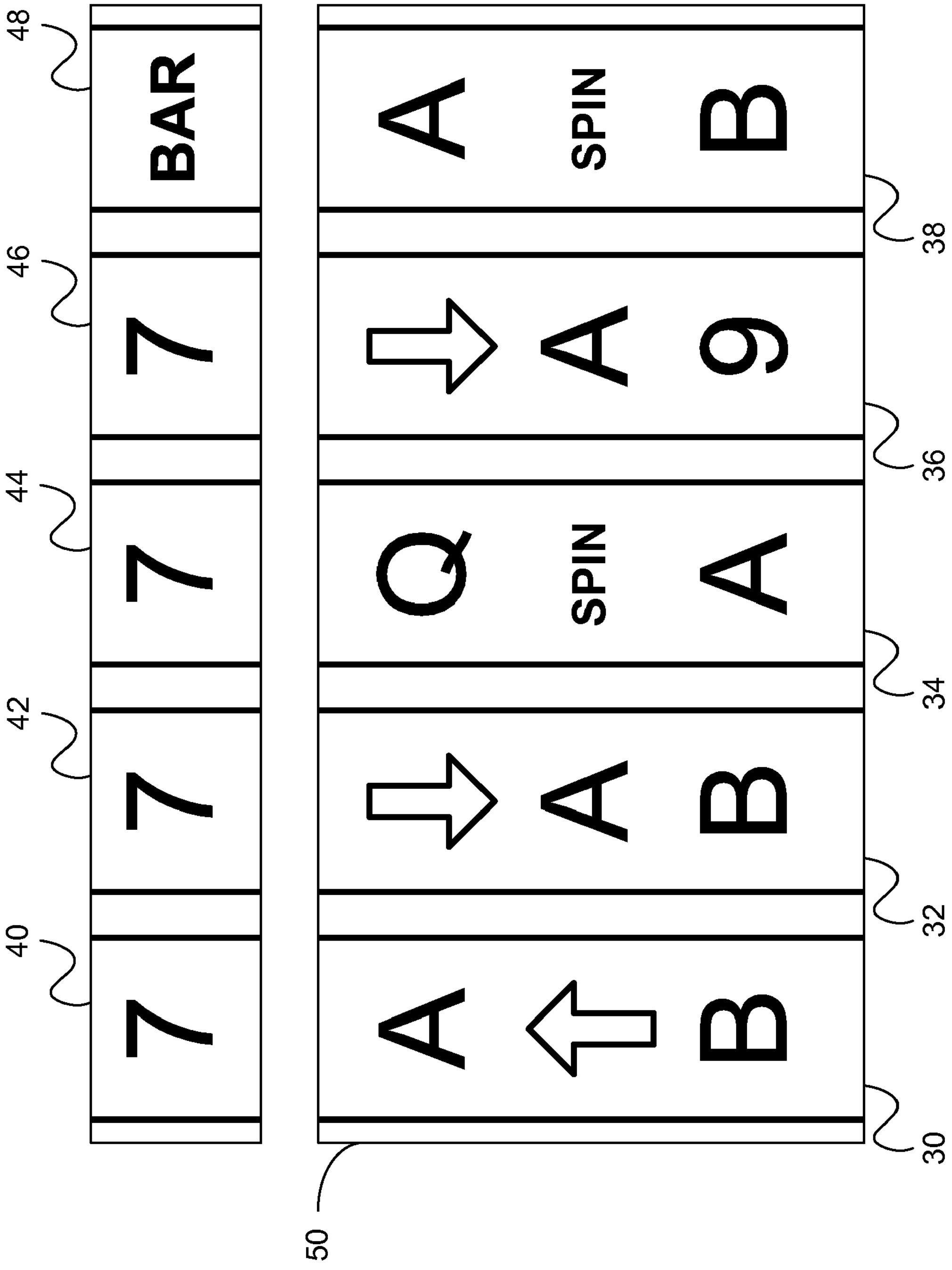
FIG. 3 illustrates a display symbols in play for a base game and a bonus game of the present invention.

FIG. 3 illustrates a display of symbols in play for a base game and a bonus game of the present invention. The base game comprises primary reels 30-38, where three symbols from each of the reels 30-38 are drawn (i.e., displayed and in play). A total of fifteen symbols is displayed and in play. Note that the number of reels and the number of symbols drawn per reel can be adjusted to suit a game designer's requirements.

Upon initializing the base game, the reels 30-38 may spin (physically or electronically) or a video graphic may be displayed to indicate to the player that symbols will be drawn. Once symbols of the reels 30-38 are drawn, the drawn symbols are displayed in a primary display area 50 to indicate that these symbols are in play. The displayed symbols of the reels 30-38 are evaluated to determine whether the symbols are in a winning combination. A winning combination can be formed in a variety of ways, including along a row of the displayed symbols, along a column of the displayed symbols, along a diagonal of the displayed symbols, or a combination thereof. For instance, a "V" pattern of "A" symbols formed by the displayed symbols can be a winning combination. Other symbol combinations and/or symbol positions of the displayed symbols can also be used to obtain other winning combinations.

The displayed symbols of the reels 30-38 are further evaluated to determine if any bonus symbols have been drawn. Bonus symbols affect movement of symbols on a corresponding set of secondary reels. For instance, the primary reel 30 can correspond to a secondary reel 40, such that when a bonus symbol is drawn on the primary reel 30, then the secondary reel 40 is adjusted according to the bonus symbol. Likewise, the primary reel 32 corresponds to a secondary reel 42; the primary reel 34 corresponds to a secondary reel 44; the primary reel 36 corresponds to a secondary reel 46; and the primary reel 38 corresponds to a secondary reel 48. In addition, each of the primary reels 30-38 may correspond to adjusting a plurality of the secondary reels 40-48.

The bonus symbols of the primary reels can cause various actions on the corresponding secondary reels. For instance, a "Spin" bonus symbol can correspond to spinning the corresponding secondary reel(s) to draw a symbol. A "Nudge Up" bonus symbol can correspond to moving the corresponding secondary reel(s) up one symbol position along the corresponding secondary reel(s) to display another symbol. A "Nudge Down" bonus symbol can correspond to moving the corresponding secondary reel(s) down one symbol position along the corresponding secondary reel(s) to display another symbol. In terms of implementation, the bonus symbols can be drawn based on the RNG. It is understood that the number of positions moved on the secondary reel for a nudge up symbol and the number of positions moved down for a nudge down symbol can be adjusted as desired. Since reels can be represented electronically, spinning the reel may refer to simply selecting one or more symbols to be randomly drawn or to be drawn in accordance to a weighted algorithm.

Figure 4:
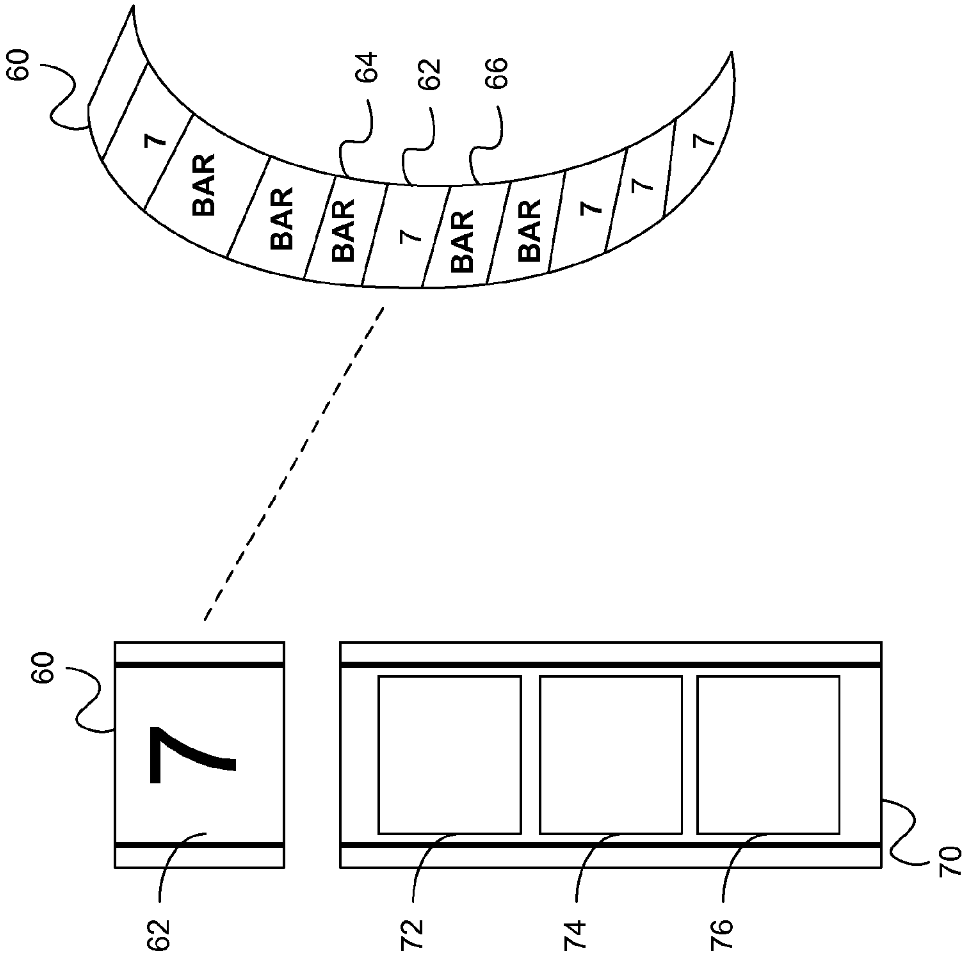
FIG. 4 illustrates a display of a primary reel and a corresponding secondary reel of the present invention.

FIG. 4 illustrates a display of a primary reel and its corresponding secondary reel of the present invention. A primary reel 70 corresponds to a secondary reel 60. The primary reel 70 can have three symbols 72-76 drawn (i.e., displayed and in play), whereas the secondary reel 60 can have one symbol 62 drawn (i.e., displayed and in play). If one of the drawn symbols 72-76 is a bonus symbol, then the secondary reel 60 is adjusted according to the bonus symbol to display another symbol on the secondary reel to place in play.

For instance, if a nudge up symbol is drawn on the primary reel 70, then the reel 60 is moved up one position from the symbol 62 that displays a "7" to a symbol 66 that displays a "BAR". Thus, the symbol 66 is displayed and is now in play. However, if a nudge down symbol is drawn on the primary reel 70, then the reel 60 is moved down one position from the symbol 62 that displays a "7" to a symbol 64 that displays a "BAR". The symbol 64 is displayed and is now in play. Furthermore, if the spin symbol is drawn, then the reel 60 is spun to draw a symbol.

If multiple bonus symbols are drawn on the primary reel 70, then the corresponding adjustment to the secondary reel 60 can be done in order of the bonus symbols on the primary reel 70. For instance, if the symbol 72 is a spin bonus symbol and the symbol 76 is a nudge down bonus symbol, then the reel 60 can be spun and stopped to display a symbol and then from that symbol move one position down to display and put in play the next symbol.

Alternatively, the bonus symbols can be arranged in a hierarchy, where only the highest ranked symbol is applied to the secondary reel. For instance, the bonus symbols can be ranked in the following order of, starting from the highest, a nudge up bonus symbol, a nudge down bonus symbol, and a spin bonus symbol. Thus, if the symbol 72 is a spin bonus symbol and the symbol 76 is a nudge down bonus symbol, then only nudge down bonus symbol is used to adjust the corresponding reel 60 since the nudge down bonus symbol has a higher rank than the spin bonus symbol.

Referring back to FIG. 3, an objective of the bonus game is to align drawn symbols on the secondary reels 40-48 into winning combinations according to a secondary reel's pay-table. The drawn symbols on the secondary reels 40-48 remain static, even between games, until a bonus symbol on a corresponding primary reel is drawn. In other words, the currently displayed symbols on the secondary reels 40-48 remain the same, until a bonus symbol on the primary reels 30-38 is displayed and in play to adjust the corresponding secondary reels 40-48. Thereby, a winning combination on the secondary reels 40-48 can continue to payout after each base game until a bonus symbol on the primary reels 30-38 changes the combination of symbols displayed on the secondary reels 40-48 to a non-winning combination.

In addition, if a bet level is altered, then the secondary reels 40-48 can be spun to obtain a new set of symbols for the secondary reels 40-48. Alternatively, a player can alter the bet to a predefined bet level to retrieve the last played set of symbols on the secondary reels 40-48. Preserving these symbols on the secondary reels can be required for maintaining an accurate return to player ("RTP"). This also creates a nice feature that allows players to "shop" the different bet levels to find a set of bonus symbols that is to their liking.

In an embodiment of the present invention, a tertiary (i.e., third) set of reels corresponding to the secondary set of reels can be present. The tertiary set of reels can correspond to playing a third game. When the tertiary set of reels is aligned in a winning combination, a player can win a progressive award.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred methods described herein but all those other and further alterations and modifications as would be apparent to those of ordinary skilled in the art.

We claim:

1. A method for playing a game of chance on a machine having one or more primary reels for a base game and one or more secondary reels for a bonus game, comprising the steps of, initiating the base game on the machine;

drawing one or more symbols of the primary reels;

displaying the drawn symbols on a display of the machine;

if the drawn symbols of the primary reels comprise one or more bonus symbols, adjusting the secondary reels to draw symbols as a function of the bonus symbols; and evaluating the drawn symbols of the secondary reels for a winning combination.

2. The method of claim 1 wherein the drawn symbols of the secondary reels are kept at the same position for a next base game.

3. The method of claim 1 in the adjusting step, wherein each of the primary reels adjusts a corresponding secondary reel.

4. The method of claim 1 wherein the bonus symbols comprise a first bonus symbol and wherein the first bonus symbol indicates adjusting a corresponding secondary reel in a first direction for a first predefined number of positions on the corresponding secondary reel.

5. The method of claim 1 wherein the bonus symbols comprise a second bonus symbol and wherein the second bonus symbol indicates adjusting a corresponding secondary reel in a second direction for a second predefined number of positions on the corresponding secondary reel.

6. The method of claim 1 wherein the bonus symbols comprise a third bonus symbol and wherein the third bonus symbol indicates adjusting a corresponding secondary reel by randomly drawing a symbol of the corresponding secondary reel.

7. The method of claim 3 wherein multiple bonus symbols are drawn for one of the primary reels and wherein the multiple bonus symbols are applied one after another to adjust the corresponding secondary reel of the primary reel.

8. The method of claim 3 wherein the bonus symbols are ranked in order, wherein multiple bonus symbols are drawn for one of the primary reels, and wherein only the highest ranked of the drawn bonus symbol is used to adjust the corresponding secondary reel of the primary reel.

9. A method for playing a game of chance on a machine having one or more primary reels for a base game and one or more secondary reels for a bonus game, comprising the steps of, initiating the base game on the machine;

drawing one or more symbols of the primary reels;

displaying the drawn symbols on a display of the machine;

if the drawn symbols of the primary reels comprise one or more bonus symbols, adjusting the secondary reels to draw symbols as a function of the bonus symbols, wherein each of the primary reels adjusts a corresponding secondary reel; and evaluating the drawn symbols of the secondary reels for a winning combination.

10. The method of claim 9 wherein the drawn symbols of the secondary reels are kept at the same position for a next base game.

11. The method of claim 9 wherein the bonus symbols comprise a first bonus symbol and wherein the first bonus symbol indicates adjusting a corresponding secondary reel in a first direction for a first predefined number of positions on the corresponding secondary reel.

12. The method of claim 9 wherein the bonus symbols comprise a second bonus symbol and wherein the second bonus symbol indicates adjusting a corresponding secondary reel in a second direction for a second predefined number of positions on the corresponding secondary reel.

13. The method of claim 9 wherein the bonus symbols comprise a third bonus symbol and wherein the third bonus symbol indicates adjusting a corresponding secondary reel by randomly drawing a symbol of the corresponding secondary reel.

14. The method of claim 9 wherein multiple bonus symbols are drawn for one of the primary reels and wherein the multiple bonus symbols are applied one after another to adjust the corresponding secondary reel of the primary reel.

15. The method of claim 9 wherein the bonus symbols are ranked in order, wherein multiple bonus symbols are drawn for one of the primary reels, and wherein only the highest ranked of the drawn bonus symbol is used to adjust the corresponding secondary reel of the primary reel.

16. A method for playing a game of chance on a machine having one or more primary reels for a base game and one or more secondary reels for a bonus game, comprising the steps of, initiating the base game on the machine;

drawing one or more symbols of the primary reels;

displaying the drawn symbols on a display of the machine;

if the drawn symbols of the primary reels comprise one or more bonus symbols, adjusting the secondary reels to draw symbols as a function of the bonus symbols, wherein each of the primary reels adjusts a corresponding secondary reel and wherein the bonus symbols comprise a first bonus symbol that indicates adjusting a corresponding secondary reel in a first direction for a first predefined number of positions on the corresponding secondary reel, a second bonus symbol that indicates adjusting a corresponding secondary reel in a second direction for a second predefined number of positions on the corresponding secondary reel, and a third bonus symbol that indicates adjusting a corresponding secondary reel by randomly drawing a symbol of the corresponding secondary reel; and evaluating the drawn symbols of the secondary reels for a winning combination, wherein the drawn symbols of the secondary reels are kept at the same position for a next base game.

17. The method of claim 16 wherein multiple bonus symbols are drawn for one of the primary reels and wherein the multiple bonus symbols are applied one after another to adjust the corresponding secondary reel of the primary reel.

18. The method of claim 17 wherein the bonus symbols are ranked in order, wherein multiple bonus symbols are drawn for one of the primary reels, and wherein only the highest ranked of the drawn bonus symbol is used to adjust the corresponding secondary reel of the primary reel.

* * * * *